Feb. 22, 1966  W. C. BARTLEY ETAL  3,237,073
CONTROLLED RECTIFIER SUPPLY FOR SERIES MOTOR
SPEED CONTROL SYSTEM
Filed Dec. 20, 1961  2 Sheets-Sheet 1

W. C. Bartley
J. P. Shipley
    INVENTORS

BY John D. Graham

W. C. Bartley
J. P. Shipley
INVENTORS.

United States Patent Office 3,237,073
Patented Feb. 22, 1966

3,237,073
CONTROLLED RECTIFIER SUPPLY FOR SERIES MOTOR SPEED CONTROL SYSTEM
William C. Bartley, Dallas, and Jimmy P. Shipley, Garland, Tex., assignors to Texas Instruments Incorporated, Dallas, Tex., a corporation of Delaware
Filed Dec. 20, 1961, Ser. No. 161,347
4 Claims. (Cl. 318—246)

This invention relates to a control system for supplying direct current to a load from an A.C. source using semiconductor controlled rectifiers. More particularly, this invention relates to a feedback control circuit adapted for use with a series motor and effective to provide a selection of speed settings.

Series motors of the type commonly used in small home appliances and hand tools have a speed-torque characteristic which is generally referred to as hyperbolic. As a motor of this type is loaded, the speed decreases sharply, but the motor has the advantageous feature of providing very high starting torque or high torque at low speeds. In appliance and hand tool applications, it would be preferable to retain the high torque characteristics at low speeds, but to provide control or selection of the no-load speed without degrading the low-speed, high-torque aspects. This type of motor is ordinarily available commercially in a form wherein the field winding is split into two parts with the armature connected in between. In this form, the armature voltage or back E.M.F. is not available at the motor terminals and so it cannot be used alone as a control factor. That is, the voltage at the motor terminals will include the voltage across the series field windings as well as the armature voltage.

It is therefore the principal object of this invention to provide a control circuit for a two-terminal series motor which will make available a plurality of no-load speed settings but will not degrade the starting torque or high torque characteristics of the series motor. Another object is to provide an improved motor control system utilizing semiconductor controlled rectifiers. Still another object is to provide an improved motor speed control circuit having a plurality of speed settings. A further object is to provide a simple and inexpensive control circuit for a universal A.C.-D.C. motor.

In accordance with this invention, an A.C. source is connected through a full-wave or half-wave rectifier and a controlled rectifier to a load which may be a two-terminal D.C. series motor. A capacitor and a resistor shunt the motor so that the motor current will be smoothed out somewhat and current will continue between half cycles of the A.C. source. The controlled rectifier is fired by applying a reference voltage between the gate of the controlled rectifier and one terminal of the load so that whenever the gate and anode voltages are positive with respect to the cathode the controlled rectifier will conduct. A phase shift arrangement and triggering device may be utilized to provide firing pulses to the gate late in each half cycle even though the reference voltage never exceeds the cathode voltage. A selective arrangement is provided to vary the reference voltage, and this selective means may be operated along with an arrangement for switching between half and full-wave rectification in the input so that an additional speed setting is provided.

The novel features believed characteristic of this invention are set forth in the appended claims. The invention itself, however, along with further objects and advantages thereof, may best be understood by reference to the following detailed description of an illustrative embodiment, when read in conjunction with the accompanying drawing, wherein:

Figure 1:
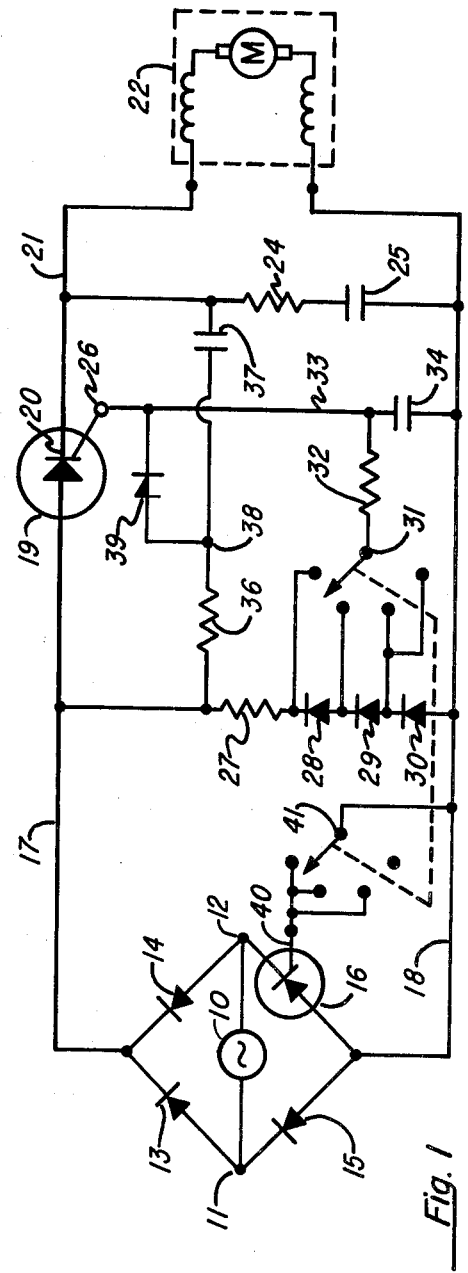
FIGURE 1 is a schematic diagram of a control circuit utilizing the principles of this invention.

With reference to FIGURE 1, a D.C. motor control circuit is shown which utilizes a semiconductor controlled rectifier as the control element in accordance with this invention. An A.C. source 10, which may be a 110 volt 60 cycle power line, is connected across opposite terminals 11 and 12 of a full-wave diode bridge. Three legs of the bridge include ordinary diodes 13, 14 and 15 while the remaining leg includes a controlled recifier 16 which serves to permit operation either as a full-wave or half-wave rectifier. The remaining terminals of the bridge are connected to positive and negative supply lines 17 and 18, across which appears a rectified A.C. voltage. The positive line 17 is connected to the anode of a controlled rectifier 19. The cathode 20 of this rectifier is connected by a line 21 to one terminal of a load 22 which may comprise a universal D.C. series motor. The negative line 18 is directly connected to the other terminal of the load 22. Series motors of the type ordinarily used in applications such as contemplated herein usually have the field windings split into two parts, one being on each side of the armature as shown. Accordingly, only two terminals are available at the input, and the armature voltage cannot be detected apart from the field potential without further terminals.

The circuit thus far described will supply unidirectional current to the load 22, with the amount of current flowing during each half cycle being determined by the point at which the controlled rectifier 19 fires. Also, this may be either full-wave or half-wave power depending upon whether the controlled rectifier 16 is conductive or nonconductive.

In order to select the firing angle of the controlled rectifier 19, a control circuit as shown in FIGURE 1 is utilized. A D.C. voltage is maintained on the cathode 20 by a resistor 24 and a large capacitor 25 which shunt the load 22. Thus the voltage on the cathode 20 will be the load voltage which has been smoothed out by the capacitor circuit. With a motor load it is seen that the capacitor 25 will discharge quickly through the load if the motor speed is low or will discharge more slowly if the motor speed is higher and the back E.M.F. is large. The capacitor 25 also serves to maintain motor current between half cycles of the A.C. supply. Without this, no back E.M.F. would appear when the controlled rectifier 19 is cut off since field current is necessary to provide the magnetic field which causes the reverse E.M.F., ignoring residual magnetism.

A reference voltage is applied to a gate electrode 26 of the controlled rectifier 19 by an arrangement including a resistor 27 and three Zener diodes 28, 29 and 30 connected in series across the lines 17 and 18. A four-position switch 31 is adapted to select the voltage present at the cathodes of one of the Zener diodes, and the armature of this switch is connected through a resistor 32 and a line 33 to the gate 26. A relatively large capacitor 34 connects the line 33 to the line 18 so that a fairly smooth reference voltage will appear on the gate 26, the value of this voltage depending upon the position of the switch 31.

The controlled rectifier 19 will begin conducting at a point during each half cycle when the anode voltage exceeds the voltage on the cathode 20 and the voltage on the gate 26 exceeds the cathode voltage by an amount adequate to fire the device. The reference voltage applied to the gate 26 will not necessarily insure that the controlled rectifier 19 will fire during each half cycle.

At high motor speeds the cathode voltage will be high also, possibly resulting in a condition wherein the cathode voltage exceeds the reference voltage. Accordingly, to prevent surging or lopping of the motor at low speed settings, it is necessary to provide some means for firing the controlled rectifier late in each half cycle so that at least a small amount of armature current will flow. This function is accomplished by a resistor 36 and a capacitor 37 connected between the anode and the cathode. A junction 38 between the resistor and capacitor is connected to the gate 26 by a threshold trigger device or 4-layer diode 39. The voltage of the junction 38 will lag the anode-cathode voltage due to the RC circuit, and the trigger diode 39 will prevent conduction until the voltage from the junction 38 to the gate 26 or cathode 20 exceeds a certain minimum. With proper selection of the values of the resistor 36 and the capacitor 37, it can thus be assured that a firing pulse will be applied to the gate 26 late in each half cycle even though the reference voltage applied to the line 33 by the Zener diode arrangement happens to be less than the back E.M.F. of the motor.

Full-wave-rectified A.C. power will be applied between the lines 17 and 18 so long as the controlled rectifier 16 is conductive. This will be the condition if the gate 40 is connected to the anode or to the line 18. If the gate is floating, the control rectifier 16 will never conduct, resulting in half-wave rectification. A switch 41 having four contacts provides selection between full-wave and half-wave rectification. This switch is ganged with the switch 31 so that when the switches 31 and 41 are in their upper three positions full-wave rectification is provided, three different reference voltage levels being established by the Zener diodes 28, 29 and 30. However, when the switches 31 and 41 are in their lowermost positions, half-wave rectification is provided since the gate 40 is floating, the reference voltage established by the Zener diode 30 being the same as in the next higher switch position.

Figure 2:
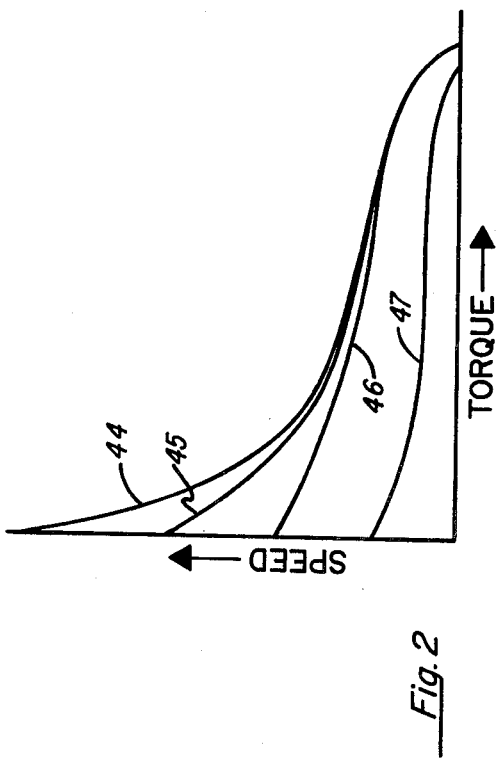
FIGURE 2 is a graphic representation of the speed vs. torque characteristics of the motor controlled by the circuit of FIGURE 1 under various conditions.

If the load 22 is a series D.C. motor as shown, the speed vs. torque curve of the motor will change for various positions of the switches 31 and 41 as seen in FIGURE 2. When the switches are in their uppermost position, the motor exhibits its standard hyperbolic speed/torque characteristic as it would with no control at all. This characteristic is seen as a curve 44 in FIGURE 2. In this condition, the controlled rectifier begins to conduct near the beginning of each half cycle, or as soon as the voltage on the gate 26 exceeds the cathode voltage, at all torque loads. In the lower speed settings of the switches 31 and 41, the motor runs at lower speeds for low torque as seen by the curves 45, 46 and 47. In the two middle switch positions, the motor sees less than 180° conduction, full-wave, at no load; but, as the motor is loaded, the controlled rectifier firing angle advances, allowing the curves 45 and 46 to approach the standard curve 44, furnishing full torque capacity. The next-to-lowest switch position results in conduction during less than 90° of each half cycle at no load while in the lowest switch position the firing angle is about the same but conduction occurs every other half cycle (half-wave rather than full-wave) resulting in the curve 47 of FIGURE 2.

Figure 3:
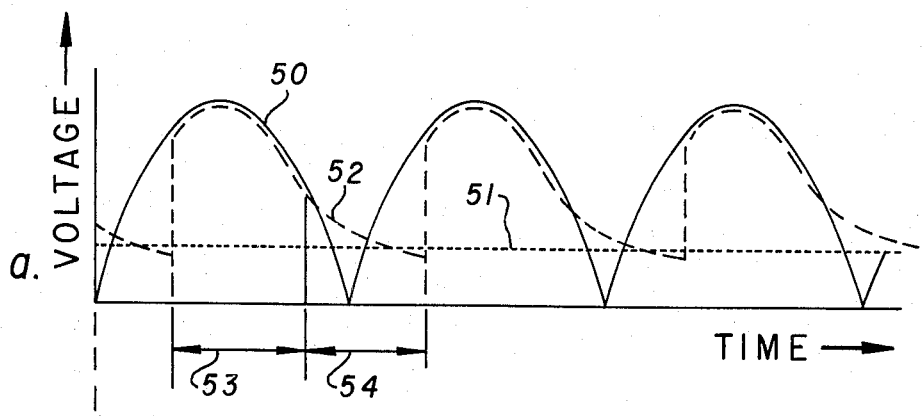
FIGURES 3a–3c are graphic representations of voltage waveforms appearing in the circuit of FIGURE 1 under various conditions.
Figure 3:
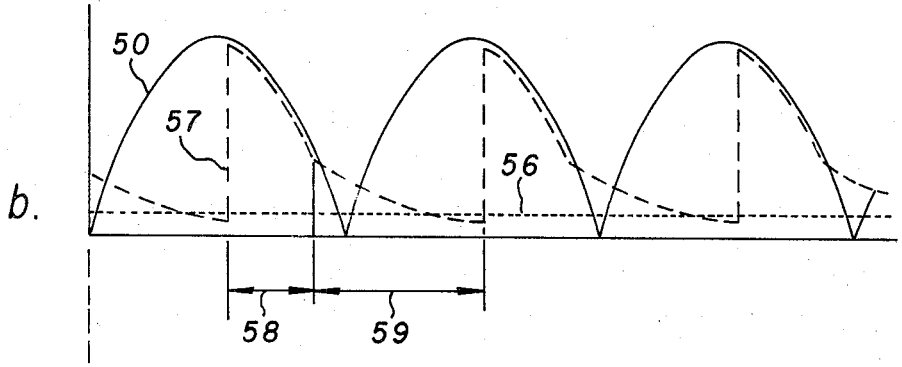
Figure 3:
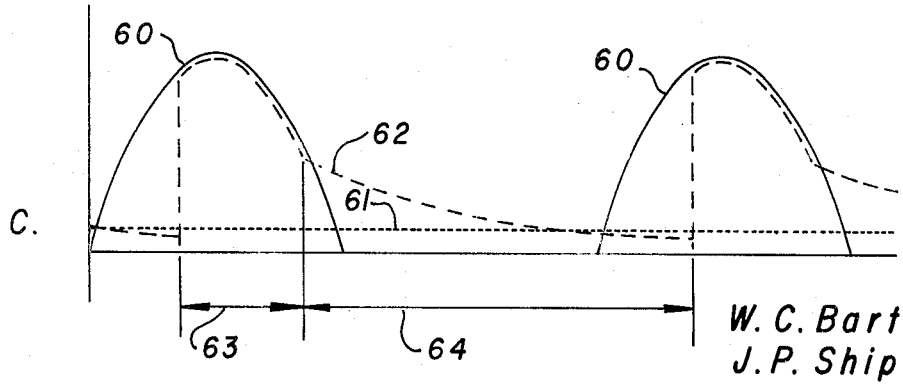

The operation of the circuit described above may best be understood by examining the voltage waveforms for the controlled rectifier 19 as seen in FIGURES 3a–3c. The voltage between the lines 17 and 18 will be a full-wave-rectified sine wave 50 as seen in FIGURE 3a. The voltage on the gate 26 will be at some reference level represented by a dotted line 51, this representing the value provided when the switches 31 and 41 are in their next to highest position, for example. Under these conditions, the cathode or load voltage will appear as a waveform 52, seen as a dashed line. The controlled rectifier will conduct for an interval 53, then will cut off and allow the capacitor to discharge through the load 22 during an interval 54. The characteristic of the load or the back E.M.F. of the motor, along with the value of the resistor 24, will determine the rate at which the capacitor 25 discharges. The series resistance of the motor will be very small, only a few ohms, so the reverse voltage of the motor and the resistor 24 will be primarily determining. No reverse voltage will be generated by the motor without field current, so the current provided by discharge of the capacitor 25 insures that a D.C. voltage will be maintained on the cathode of the controlled rectifier in the intervals between conductive periods. Without this discharge current, the feedback related to motor speed could not be utilized.

For a lower setting of the switch 31, the next-to-lowest setting, for example, the reference voltage might be at a level 56 as seen in FIGURE 3b. In this case, the cathode or load voltage would appear as seen by the dashed line 57, the input voltage wave-form 50 being the same as before. The controlled rectifier will begin conducting later in each half cycle, at least in the no-load condition, since the capacitor 25 must now discharge to a lower value to be below the gate voltage. The controlled rectifier will thus conduct for an interval 58 and will be nonconductive for an interval 59. If the motor was loaded down, however, the capacitor would discharge more rapidly and the controlled rectifier would fire earlier in each half cycle.

In the condition of FIGURE 3b, which is assumed to be the lowest speed setting for full-wave operation, the circuit may be arranged so that for low torque the controlled rectifier is fired by the breakdown of the diode 39 rather than by the voltage on the line 33. As the load is increased, however, the reference voltage provided by the Zener diode 30 would be determining since the capacitor 25 would discharge to below this value.

When the switches 31 and 41 are in the lower position, the voltage between the lines 17 and 18 will be half-wave rather than full-wave, as seen by the waveform 60 of FIGURE 3c. The reference voltage on the gate 26 will be the same as before, so the level 61 will be the same as the level 56. The controlled rectifier will fire earlier in one of the half-cycles 60, compared to the FIGURE 3b situation, since the capacitor will have a longer interval to discharge as seen by the cathode voltage waveform 62. The conductive interval 63 will thus be longer than the interval 58, but the no-load motor speed will be lower since the nonconductive interval 64 is much longer in proportion than the interval 59 of FIGURE 3b.

It should be recognized, of course, that the waveforms of FIGURES 3a–3c are merely for illustration and are not necessarily in the correct proportion. The waveforms 52, 57 and 62, for example, are distorted in the discharge portions since the discharge would actually occur at a much lower voltage in relation to the peak voltage of the A.C. input.

While the circuit components utilized in any particular application would vary depending upon the requirements, the following component values are given for illustrative purposes only:

| | |
|---|---|
| Resistor 24 | 20 ohm. |
| Resistor 27 | 3k ohm. |
| Resistor 32 | 2.7k ohm. |
| Resistor 36 | 38k ohm. |
| Capacitor 25 | 10 μfd. |
| Capacitor 34 | 0.47 μfd. |
| Capacitor 37 | 0.47 μfd. |

While this invention has been described with reference to a particular embodiment, this description is not meant to be construed in a limiting sense. It is, of course, understood that various modifications may be made by persons skilled in the art, and so it is contemplated that the appended claims will cover any such modifications as fall within the true scope of the invention.

What is claimed is:
1. A motor control system comprising:
 (a) an alternating current source,
 (b) a full-wave rectifier having an input connected to said alternating current source and having positive and negative output terminals,
 (c) a motor having first and second input terminals, the armature and field windings of said motor being connected in series between said first and second input terminals, said second input terminal being connected to the negative output terminal of said rectifier,
 (d) a semiconductor controlled rectifier having an anode, a cathode and a gate, said anode being connected to the positive output terminal of said rectifier, said cathode being connected to the first input terminal of said motor,
 (e) a first capacitor and a first resistor connected in series across the first and second input terminals of said motor,
 (f) a second resistor and a second capacitor connected in series in the named order between said anode and said cathode,
 (g) a unidirectional conductive threshold trigger device connected between said gate and the juncture of said second resistor and said second capacitor,
 (h) means connected between said second input terminal and said gate to apply a voltage reference thereto, said means being selectively adjustable to provide several different magnitudes of said voltage reference whereby a plurality of no-load speed settings are available.

2. A motor control system comprising:
 (a) an alternating current source,
 (b) a rectifier bridge having an input connected to said alternating current source and having positive and negative output terminals, one of the arms of said bridge including a first controlled rectifier having an anode, a cathode, and a gate,
 (c) a motor having first and second input terminals, the armature and field windings of said motor being connected in series between said first and second input terminals, said second input terminal being connected to the negative output terminal of said rectifier,
 (d) a second controlled rectifier having an anode, a cathode and a gate, said anode being connected to the positive output terminal of said rectifier, said cathode being connected to the first input terminal of said motor,
 (e) a first capacitor and a first resistor connected in series across the first and second input terminals of said motor,
 (f) a second resistor and a second capacitor connected in series in the named order between said anode and said cathode of said second controlled rectifier,
 (g) a unidirectional conductive threshold trigger device connected between said gate and the juncture of said second resistor and said second capacitor whereby said second controlled rectifier will be fired late in each half cycle of said source regardless of other control settings,
 (h) a plurality of Zener diodes connected in series between said positive and negative output terminals to provide a plurality of different reference voltages,
 (i) selective means for coupling any one of said reference voltages to the gate of said second controlled rectifier to provide a plurality of no-load speed settings for said motor,
 (j) and switching means for selectively shorting the gate and anode of said first controlled rectifier whereby full-wave and half-wave rectification are alternatively provided by said rectifier bridge to permit additional no-load speed setting.

3. Apparatus according to claim 2 wherein said selective means and said switching means include multi-position switches which are gauged together to provide a single speed selection means.

4. Apparatus according to claim 2 wherein the magnitude of said first resistor is substantially greater than the internal resistance of said motor.

References Cited by the Examiner
UNITED STATES PATENTS

| | | | |
|---|---|---|---|
| 2,552,206 | 5/1951 | Moyer | 318—246 |
| 2,785,368 | 3/1957 | Elliot | 318—331 |
| 2,981,880 | 4/1961 | Momberg | 318—246 |
| 3,064,174 | 11/1962 | Dinger | 318—246 |

ORIS L. RADER, *Primary Examiner.*